United States Patent [19]

Freppel

[11] 4,361,682

[45] Nov. 30, 1982

[54] PROCESS FOR PREPARING BIMODAL OR MULTIMODAL POLYMERS OF CONJUGATED DIENES

[75] Inventor: Christian Freppel, Chamalieres, France

[73] Assignee: Compagnie Generale Des Establissements Michelin, Clermont-Ferrand, France

[21] Appl. No.: 251,977

[22] Filed: Apr. 6, 1981

[30] Foreign Application Priority Data

Apr. 9, 1980 [FR] France .............................. 80 08109

[51] Int. Cl.$^3$ .............................................. C08F 4/08
[52] U.S. Cl. ...................................... 526/66; 525/232; 525/236; 526/78; 526/79; 526/86
[58] Field of Search ....................... 526/78, 86, 66, 79

[56] References Cited

U.S. PATENT DOCUMENTS 4,079,176 3/1978 Zarauz ................................ 526/177
4,080,492 3/1978 Zarauz ................................ 526/177
4,092,268 5/1978 Zarauz ................................ 252/430
4,129,705 12/1978 Zarauz ................................ 526/175

*Primary Examiner*—Stanford M. Levin
*Attorney, Agent, or Firm*—Brumbaugh, Graves, Donohue & Raymond

[57] ABSTRACT

A process of preparing a bimodal or multimodal homopolymer of a conjugated diene or a bimodal or multimodal copolymer of a conjugated diene with another conjugated diene or with a vinyl aromatic compound consists in polymerizing the monomer(s) in a reaction medium at a temperature of between 20° C. and 200° C. in the presence of a catalytic system comprising an organolithium initiator, a barium, strontium or calcium compound, and an organometallic compound of a metal of group 2B or 3A of the periodic classification of elements of the Mendeleev Table and adding hydrogen as a modifying agent to the reaction medium during the course of the polymerization reaction.

4 Claims, 2 Drawing Figures

FIG. 1.1
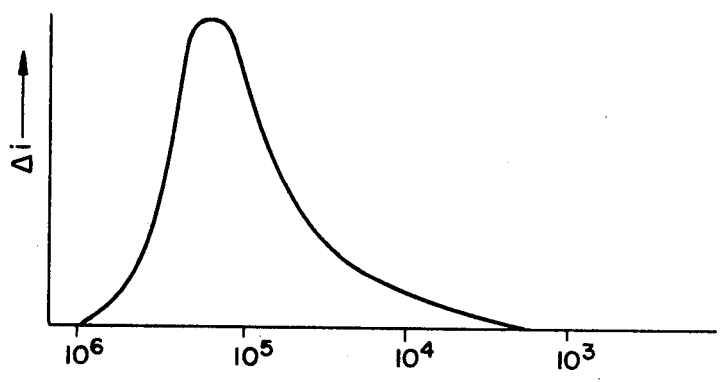
FIG. 1.2
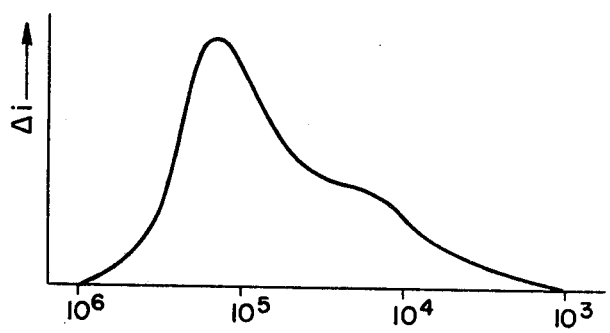

PROCESS FOR PREPARING BIMODAL OR MULTIMODAL POLYMERS OF CONJUGATED DIENES

The object of the present invention is a process which makes it possible to modify the molecular weight distribution upon the synthesis of a homopolymer of a conjugated diene or a copolymer of a conjugated diene with another conjugated diene or with a vinyl aromatic compound.

From French patent application Nos. 74 19 475, 75 20 007 and 76 04 115 (which correspond to U.S. Pat. Nos. 4,080,492 and 4,092,268; 4,079,176; and 4,129,705, respectively) it is known to prepare a homopolymer of a conjugated diene or a copolymer of a conjugated diene with another conjugated diene or with a vinyl aromatic compound having simultaneously a very low content of 1,2 or 3,4 linkages and a high content of trans-1,4 linkages by means of a catalyst system comprising an organolithium initiator, a barium, strontium or calcium compound and an organo-metallic compound of a metal of group 2B or 3A of the periodic classification of elements of the Mendeleev Table, and possibly an alkali metal alcoholate.

It is desirable to have means which make it possible to modify and regulate the distribution of the molecular weights of the homopolymer of a conjugated diene or a copolymer of a conjugated diene with another conjugated diene or with a vinyl aromatic compound for a number of industrial uses of these products, since the modification of the molecular weight distribution makes it possible to improve greatly certain properties such as, for instance, the machineability, the cold flow, the raw coherence, the raw tackiness, etc., without penalizing the other properties.

It is known to the man skilled in the art that it is possible to broaden the molecular weight distribution and obtain bimodal or multimodal polymers by mixing together several polymers of different viscosity.

However, such a process has the drawback of requiring the separate synthesis of several polymers of different viscosities, which results in problems of reproducibility of the process, requires very large quantities of catalyst, results in long periods of time and finally makes this process uninteresting both from a technical standpoint and from an economic standpoint.

It is also known to modify the molecular weight distribution of homopolymers in processes carried out either batchwise or continuously by breaking up the amount of catalyst necessary and adding it at different times during the course of the homopolymerization or copolymerization. However, such a manner of operation, which also requires very large amounts of catalyst, which are larger the greater the desired broadening of the molecular weight distribution is, is therefore also very expensive. Furthermore, it would be extremely difficult to carry out industrially.

The object of the present invention is to remedy these drawbacks by providing a process which is economically more interesting and which makes it possible easily to modify and regulate the molecular weight distribution during the course of the synthesis of a homopolymer of a conjugated diene or a copolymer of a conjugated diene with another conjugated diene or with a vinyl aromatic compound and to obtain a bimodal or multimodal homopolymer or copolymer.

The applicant has unexpectedly found that it is possible to achieve this purpose when the homopolymerization of the conjugated diene or the copolymerization of the conjugated diene with another conjugated diene or with a vinyl aromatic compound by the use of the catalyst systems described above is effected in the presence of a modifying agent which is not a polymerization initiator.

Thus, the present invention concerns a process of preparing a homopolymer of a conjugated diene or a copolymer of a conjugated diene with another conjugated diene or with a vinyl aromatic compound, whether bimodal or multimodal, which consists in polymerizing the monomer(s) in a reacting medium at a temperature of between 20° C. and 200° C. in the presence of a catalyst system comprising an organolithium initiator, a barium, strontium or calcium compound, and an organometallic compound of a metal of group 2B or 3A of the periodic classification of elements of the Mendeleev Table, characterized by adding hydrogen as a modifying agent to the reaction medium during the course of the polymerization reaction.

The periodic classification of elements of the Mendeleev Table referred to herein is that given in the 59th edition of the "Handbook of Chemistry and Physics".

This process makes is possible to modify the molecular weight distribution as desired and to obtain improved properties of raw tackiness, raw coherence and machineability without requiring additional amounts of catalyst and without, at the same time, penalizing the other properties.

The process of the invention makes is possible to obtain homopolymers and copolymers having bimodal or multimodal molecular weight distributions. The fraction or fractions obtained after addition of the modifying agent are of low molecular weight. Furthermore, the average molecular weights of said fraction or fractions of low molecular weight as well as the quantity of these low molecular weights are a function of the amount of the modifying agent added and of the time when this modifying agent is added during the course of the polymerization reaction.

By selecting the amount to be added and the time of the addition as a function of the percentage of conversion of the monomers at the time in question as compared with the final conversion percentage, it is possible to prepare bimodal or multimodal homopolymers and copolymers, the quantity of the high and low molecular weights of which as well as the respective average molecular weights of these high and low molecular weights can be regulated as desired.

It is desirable to use amounts of hydrogen solubilized in the reaction medium of between 0.1 and 100 ppm. The larger the amount of solubilized hydrogen, the lower the molecular weight of the low molecular weights will be.

The hydrogen is added during the course of the polymerization reaction and preferably when the conversion of the monomers is between 20% and 90%. The polymerization process can be conducted in bulk or in solution in a hydrocarbon solvent either batchwise or continuously. In the latter case, one operates in two or more reactors placed in series at identical or different polymerization temperatures. Depending on the extent of the effect desired, the hydrogen is added in one or more portions.

By "organolithium initiator" there is understood, first of all, any organometallic compound having one or more carbon-lithium bonds, secondly, any radical-ion adduct of lithium and of certain polynuclear aromatic hydrocarbons, thirdly, metallic lithium itself and, finally, the oligomers produced by the addition of lithium to conjugated dienes or substituted styrenes.

As representative examples of organolithium initiator, the following compounds may be mentioned:

The aliphatic organolithiums such as ethyl lithium, n-butyl lithium, isobutyl lithium, sec-butyl lithium, tert.-butyl lithium, isopropyl lithium, n-amyl-lithium, iso-amyl lithium; the alkenyl organolithiums such as allyl lithium, propenyl lithium, isobutenyl lithium, the "living" polybutadienyl lithium, polyisoprenyl lithium and polystyryl lithium polymers; the dilithium polymethylenes such as 1,4-dilithiobutane, 1,5-dilithiopentane, 1,20-dilithioeicosane; the aromatic organolithiums such as benzyl lithium, phenyl lithium and 1,1-diphenyl methyl lithium; the polylithiums resulting from the reaction of metallic lithium with aryl-substituted ethylene compounds such as 1,1-diphenylethylene, trans-stilbene and tetraphenylethylene; the radical ions such as lithium naphthalene, lithium anthracene, lithium chrysene and lithium diphenyl, as well as the derivatives substituted by one or more alkyls.

By "a barium, strontium or calcium compound" there are understood the hydrides $BaH_2$, $SrH_2$ and $CaH_2$, the mono- or polyfunctional organic acid salts of the formulas $(R-COO)_2Ba$ or $Sr$ or $Ca$, $R^1-(COO)_2Ba$ or $Sr$ or $Ca$ in which $R$ and $R^1$ are organic radicals, the first monovalent and the second divalent, having no other functions capable of inactivating the organolithium initiator, and the corresponding thio acids, as well as the mono- or polyfunctional alcoholates and the corresponding thiolates; the mono- or polyfunctional phenates and the corresponding thiophenates; the salts of alcohol acids and phenol acids of barium, strontium or calcium such as the reaction products of barium, strontium or calcium with acetylacetone, dibenzoylmethane, thenoyltrifluoro acetone, benzoyltrifluoro acetone and benzoyl acetone; the organic derivatives of barium, strontium or calcium such as those of 1,1-diphenylethylene, 1,2-acenaphthylene, tetraphenylbutane, α-methylstyrene or else those such as biphenyl barium, strontium or calcium, barium, strontium or calcium bis-cyclopentadienyl, the barium, strontium or calcium trialkylsilyls and barium, strontium or calcium triphenylsilyl; the mixed organic derivatives such as phenyl barium iodide and methyl strontium iodide or methyl calcium iodide, the barium, strontium or calcium salts of secondary amines; the ketonic metals such as barium, strontium or calcium benzophenone, barium, strontium or calcium cinnamone and the corresponding alkyl products as well as the sulfur homologs; the radical ions of barium, strontium and calcium such as those of naphthalene, anthracene, chrysene, diphenyl, etc.

As representative examples of organometallic compounds of groups 2B and 3A, there may be mentioned:

The zinc or cadmium dialkyls such as diethyl zinc, diethyl cadmium; the halogenated or nonhalogenated organoaluminums such as triethyl aluminum, triisobutyl aluminum, diethyl aluminum chloride, ethyl aluminum dichloride, ethyl aluminum sesquichloride, methyl aluminum sesquichloride; the dialkyl aluminum hydrides such as diethyl aluminum hydride, diisobutyl aluminum hydride, etc.

The barium, strontium or calcium compounds as well as the organometallic compounds of group 2B or 3A may be present in the form of a single compound having one of the following formulas:

$$M^1(M^3R^1R^2R^3R^4)_2$$

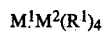

$$M^1M^2(R^1)_4$$

in which $M^1$ represents barium, strontium or calcium, $M^3$ represents a metal of group 3A, $M^2$ represents a metal of group 2B of the periodic classification of elements of the Mendeleev Table and $R^1$, $R^2$, $R^3$ represent an alkyl or aralkyl radical, and $R^4$ represents either an alkyl or aralkyl radical or a radical XB in which X represents an oxygen, sulfur or nitrogen atom and B is either an alkyl or aralkyl radical or a radical $M^3(R^5R^6)$ in which $R^5$, $R^6$ represent an alkyl or aralkyl radical.

The homopolymerization or copolymerization can also be carried out by means of the catalyst system defined above which furthermore contains an alkali metal alcoholate and more particularly an alcoholate having one of the following two formulas:

$$R(OCH_2CH_2)_nOM'$$

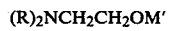

$$(R)_2NCH_2CH_2OM'$$

in which M' represents an alkali metal such as lithium, sodium or potassium and R represents an alkyl radical and n a whole number.

As hydrocarbon solvent use may be made of aliphatic solvents, such as hexane and heptane, or aromatic solvents, such as benzene and toluene.

The process of the invention is suitable in particular for the homopolymerization of a conjugated diene or the copolymerization of a conjugated diene with another conjugated diene or with a vinyl aromatic compound.

As representative examples of conjugated dienes mention may be made of butadiene-1,3, isoprene, 2,3-dimethyl-butadiene-1,3, pentadiene-1,3, 2-methyl-pentadiene-1,3 and 2,4-hexadiene.

As representative examples of vinyl aromatic compounds, there are suitable, in particular, styrene, ortho-, meta- and para-methylstyrene, "vinyl toluene", the di- and poly-methylstyrenes, p-tertiobutylstyrene, the vinyl naphthalenes, the methoxystyrenes, the halostyrenes, vinyl mesitylene and divinyl benzene.

The following nonlimitative example is given by way of illustration of the invention. In this example, the inherent viscosities are established at 25° C. in a 1 g./liter solution in toluene; the concentrations of compounds constituting the catalyst system are expressed in micromols per 100 g. of monomers. The percentages of 1,2 and trans linkages are expressed with respect to the polybutadiene portion and the percentage of styrene is expressed with respect to the total amount of copolymer obtained.

The time elapsed between the start of the polymerization reaction and the moment when the modifying agent is added is designated in the example as "elapsed time" and the percentage of conversion reached at the time of the addition of the modifying agent is designated as "% conv.".

BRIEF DESCRIPTION OF THE DRAWINGS

The FIGS. 1.1 and 1.2 of the drawing show the distribution of the molecular weights of the copolymers obtained at the end of the polymerization reaction which was obtained by gel permeation chromatography. The molecular weights are shown on the abscissa and the refraction index difference Δi on the ordinate.

It is noted that the hydrogen added during the course of the polymerization reaction gave a bimodal distribution of the molecular weights.

| | Catalyst System | | | Addition of H$_2$ | | | | Copolymer | | | | |
|---|---|---|---|---|---|---|---|---|---|---|---|---|
| Test | AlR$_3$ | Ba(OR)$_2$ | BuLi | Elapsed Time | % Conv. at Elapsed Time | Amount of Solubilized H$_2$ in ppm. | % Final Conversion | Viscosity | % 1,2 | % trans. | % Styrene | Drawing FIG. |
| 1 | 4000 | 500 | 1500 | | | | 83 | 1.52 | 5 | 79 | 10 | 1.1 |
| 2 | 4000 | 500 | 1500 | 15 min. | 54 | 7 | 85 | 1.1 | 4.8 | 79 | 11 | 1.2 |

EXAMPLE

Two tests were carried out. 100 ml. of toluene as solvent, 17.5 g. of monomers comprising 77% by weight butadiene and 23% by weight styrene were introduced into 250 ml. Steinie bottles under nitrogen pressure. The catalyst system comprising the cocatalyst preformed for 30 minutes by reaction between barium ethyl diglycolate Ba[O(CH$_2$C-H$_2$O)$_2$C$_2$H$_5$]$_2$ and triisobutyl aluminum Al(i-Bu)$_3$ butyl lithium was then added in the order indicated. The bottles were placed in a tank maintained thermostatically at 75° C. in which they were agitated.

In Test 2, hydrogen was added during the course of the polymerization in such an amount that the amount of hydrogen solubilized in the reaction medium was 7 ppm.

At the end of an hour, all the polymerization reactions were stopped by the addition of methanol and the copolymers were recovered in conventional manner.

The results are set forth in the Table and in FIGS. 1.1–1.2.

What is claimed is:

1. A process of preparing a bimodal or multimodal homopolymer of a conjugated diene or a bimodal or multimodal copolymer of a conjugated diene with another conjugated diene or with a vinyl aromatic compound, consisting in polymerizing the monomer(s) in a reaction medium at a temperature of between 20° C. and 200° C. in the presence of a catalyst system comprising an organolithium initiator, a barium, strontium or calcium compound, and an organometallic compound of a metal of group 2B or 3A of the periodic classification of elements of the Mendeleev Table, characterized by adding hydrogen as a modifying agent to the reaction medium during the course of the polymerization reaction.

2. A process according to claim 1, characterized by the fact that the amount of hydrogen solubilized in the reaction medium is between 0.1 and 100 ppm.

3. A process according to claim 1 or 2, characterized by the fact that the polymerization is conducted in a hydrocarbon solvent.

4. A process according to claim 3, characterized by the fact that the polymerization is conducted continuously.

* * * * *